US010482352B2

(12) United States Patent
Osada et al.

(10) Patent No.: US 10,482,352 B2
(45) Date of Patent: Nov. 19, 2019

(54) INFORMATION PROCESSING DEVICE AND NON-TRANSITORY COMPUTER READABLE MEDIUM

(71) Applicant: FUJI XEROX CO., LTD., Tokyo (JP)

(72) Inventors: Genki Osada, Kanagawa (JP); Roshan Thapliya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 85 days.

(21) Appl. No.: 15/693,093

(22) Filed: Aug. 31, 2017

(65) Prior Publication Data
US 2018/0268262 A1  Sep. 20, 2018

(30) Foreign Application Priority Data
Mar. 15, 2017 (JP) .................. 2017-049429

(51) Int. Cl.
*G06K 9/62* (2006.01)
*G06K 9/00* (2006.01)
*G10L 25/63* (2013.01)
*G06K 9/46* (2006.01)

(52) U.S. Cl.
CPC ....... *G06K 9/6269* (2013.01); *G06K 9/00302* (2013.01); *G06K 9/00335* (2013.01); *G06K 9/4628* (2013.01); *G06K 9/6202* (2013.01); *G06K 9/6271* (2013.01); *G10L 25/63* (2013.01)

(58) Field of Classification Search
CPC ............. G06K 9/6269; G06K 9/00302; G06K 9/00335; G06K 9/00; G06K 9/4628
See application file for complete search history.

(56) References Cited

U.S. PATENT DOCUMENTS

| 10,043,261 | B2 * | 8/2018 | Bhaskar | G06T 7/0006 |
| 2014/0079297 | A1 * | 3/2014 | Tadayon | G06K 9/00 382/118 |
| 2014/0337257 | A1 * | 11/2014 | Chatterjee | G06F 16/93 706/12 |
| 2014/0358745 | A1 * | 12/2014 | Lunan | G06Q 40/12 705/30 |

(Continued)

FOREIGN PATENT DOCUMENTS

| JP | 2010-279638 A | 12/2010 |
| JP | 2015-011107 A | 1/2015 |
| JP | 2016-115057 A | 6/2016 |

OTHER PUBLICATIONS

Liu et al. "Recurrent Neural Network for Text Classifiction with Multi-Task Learning" Shanghai Key Lab of Intelligent Information Processing, Fudan University (May 2016) pp. 1-7.*

(Continued)

*Primary Examiner* — Mia M Thomas
(74) *Attorney, Agent, or Firm* — Oliff PLC

(57) ABSTRACT

Information processing including, a first data acquirer that acquires first observational data; a second data acquirer that acquires second observational data; and a processor that performs machine learning by semi-supervised learning to output an emotion of a person as a latent factor using training data of the first observational data and the second observational data, and that infers and outputs the emotion from at least one of the first observational data and the second observational data using a trained model.

15 Claims, 13 Drawing Sheets

(56) References Cited

U.S. PATENT DOCUMENTS

| | | | | |
|---|---|---|---|---|
| 2015/0044649 A1* | 2/2015 | Voss | ............... | G06K 9/00315 |
| | | | | 434/236 |
| 2015/0131873 A1* | 5/2015 | Brandt | ............... | G06K 9/00295 |
| | | | | 382/118 |
| 2015/0347822 A1* | 12/2015 | Zhou | ............... | G06K 9/4628 |
| | | | | 382/118 |
| 2016/0300099 A1* | 10/2016 | Xiaolu | ............... | G06F 3/012 |
| 2017/0147905 A1* | 5/2017 | Huang | ............... | G06K 9/6232 |
| 2017/0193400 A1* | 7/2017 | Bhaskar | ............... | G06F 17/5009 |
| 2017/0262736 A1* | 9/2017 | Yu | ............... | G06K 9/00718 |
| 2018/0165554 A1* | 6/2018 | Zhang | ............... | G06K 9/6269 |
| 2018/0268262 A1* | 9/2018 | Osada | ............... | G06K 9/6269 |
| 2018/0365512 A1* | 12/2018 | Molchanov | ............... | G06K 9/46 |
| 2018/0365532 A1* | 12/2018 | Molchanov | ............... | G06K 9/46 |
| 2019/0018019 A1* | 1/2019 | Shan | ............... | G01N 33/6851 |

OTHER PUBLICATIONS

Krizhevsky et al. "ImageNet Classification with Deep Convoluntional Neural Networks" Magazine Communications of the ACM CACM vol. 60 Issue 6, Jun. 2017, pp. 84-90.*

D. P. Kingma and M. Welling, "Auto-Encoding Variational Bayes", in Proceedings of the International Conference on Learning Representations (ICLR-14), 2014, pp. 59-79.

* cited by examiner

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-049429 filed on Mar. 15, 2017.

BACKGROUND

Technical Field

The present invention relates to an information processing device and a non-transitory computer readable medium.

SUMMARY

According to an aspect of the invention, there is provided an information processing device including: a first data acquirer that acquires first observational data; a second data acquirer that acquires second observational data; and a processor that performs machine learning by semi-supervised learning to output an emotion of a person as a latent factor using training data of the first observational data and the second observational data, and that infers and outputs the emotion from at least one of the first observational data and the second observational data using a trained model.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described based on the drawings.

Figure 1:
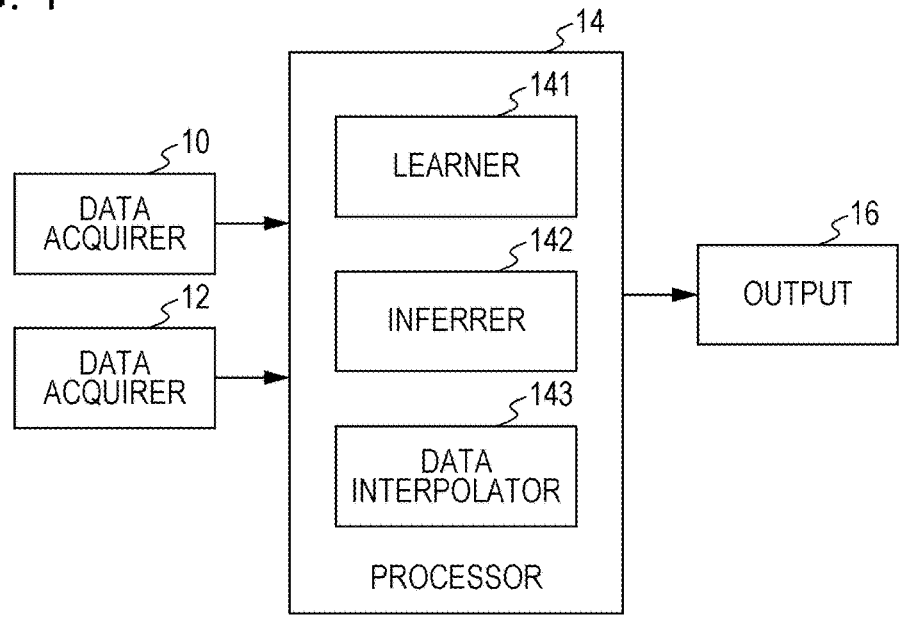
FIG. 1 is a configuration block diagram of an information processing device.

FIG. 1 illustrates a configuration block diagram of an information processing device in the exemplary embodiment. The information processing device includes data acquirers 10, 12, a processor 14, and an output 16.

The data acquirers 10, 12 acquire different data (observational data), and supply the data to the processor 14. From the viewpoint of improvement of accuracy of inference processing by the processor 14, it is desirable that the observational data acquired by the data acquirers 10, 12 correlate to each other. For instance, the data acquirer 10 acquires data on motion of joints of a person, and the data acquirer 12 acquires voice data on the person.

The observational data may be supplied from the data acquirers 10, 12 to the processor 14 wired or wirelessly or via a communication line such as the Internet. In other words, the data acquirers 10, 12 and the processor 14 do not need to be provided physically in proximity or in a single housing, and may be away from each other. Although the data acquirers 10, 12 are illustrated in FIG. 1, another data acquirer may be further provided.

The processor 14 inputs observational data from the data acquirers 10, 12, processes these observational data, and infers the emotion of a person as a latent factor. The processor 14 includes a learner 141, an inferrer 142, and a data interpolator 143 as functional blocks.

The learner 141 collects training data from the observational data acquired by the data acquirers 10, 12, and performs machine learning using the training data. The algorithms for machine learning include the following:

(1) Supervised Learning

A function, which maps an input to a corresponding output (label), is approximately generated.

(2) Unsupervised Learning

A model is constructed from input (example without a label) only.

(3) Semi-Supervised Learning

Both an example with a label and an example without a label can be handled.

In the exemplary embodiment, machine learning is performed by particularly the (3) semi-supervised learning. It is to be noted that learning refers to searching for an optimal value while a weight W in a model is adjusted.

The inferrer 142 uses a model obtained through learning by the learner 141 to infer the emotion of a person using the observational data acquired by the data acquirers 10, 12. The inferrer 142 outputs a result of the inference to the output 16. Although the inferrer 142 infers an emotion basically using both the observational data acquired by the data acquirers 10, 12, even when the observational data of either one of the data acquirers 10, 12 is missing, the inferrer 142 continues to make emotion inference using the remaining not missing observational data. This is made possible in the following manner: when an emotion as a latent factor is inferred from pieces of observational data, in a series of processes that calculate characteristic quantities from the pieces of observational data, and calculate a latent factor from the characteristic quantities, the characteristic quantities are calculated from the observational data so as to correlate to each other. This will be described later. Since even when the observational data of either one of the data acquirers 10, 12 is missing, the inferrer 142 continues to make emotion inference using the remaining not missing observational data, the inferrer 142 is designed to infer an emotion as a latent factor using at least one of the observational data of the data acquirers 10, 12. Specifically, (a) when none of the observational data of the data acquirers 10, 12 is missing, an emotion is inferred using both observational data, (b) when the observational data of the data acquirer 10 is missing, an emotion is inferred using the observational data of the data acquirer 12, and (c) when the observational data of the data acquirer 12 is missing, an emotion is inferred using the observational data of the data acquirer 10.

When data is missing in either of the data acquirers 10 and 12, the data interpolator 143 interpolates the missing data using an inference result obtained by the inferrer 142. The data interpolation includes a process of generating observational data using an inference result obtained by the inferrer 142, specifically, an emotion as an inferred latent factor, and a process of interpolating a missing portion by the generated observational data. The data interpolator 143 outputs a result of the data interpolation to the output 16.

An inference result and a data interpolation result may be supplied from the processor 14 to the output 16 wired or wirelessly or via a communication line such as the Internet. In other words, the processor 14 and the output 16 do not need to be provided physically in proximity or in a single housing, and may be away from each other.

The configuration block in FIG. 1 may be implemented, for instance, by installing the data acquirers 10, 12 and the output 16 on the client side in a server client system and installing the processor 14 on the server side. However, the implementation is not limited to this.

Figure 2:
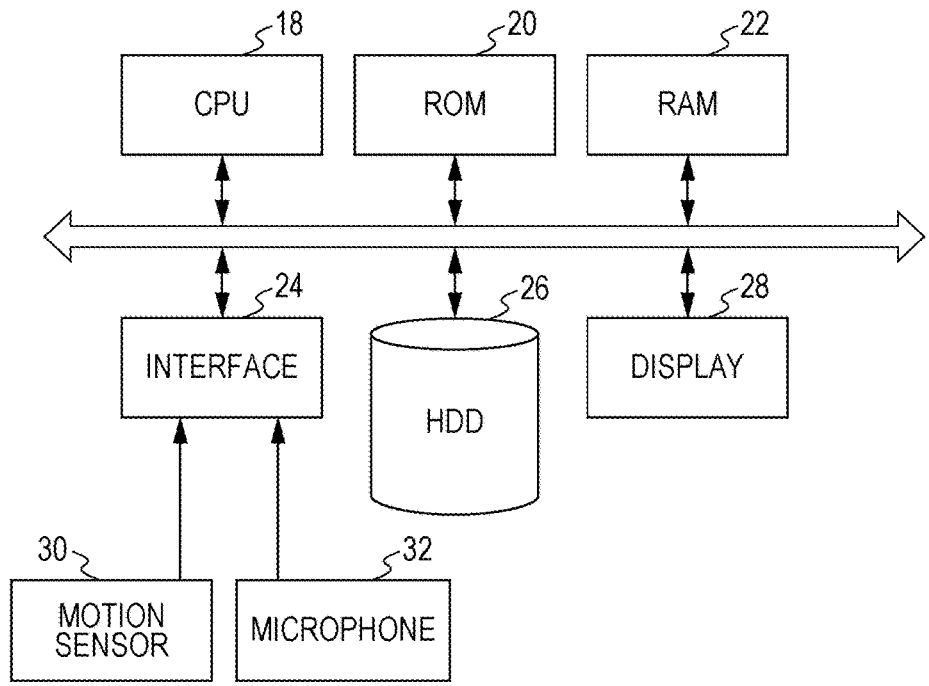
FIG. 2 is a specific configuration diagram of the information processing device.

FIG. 2 illustrates a specific configuration diagram of the configuration block illustrated in FIG. 1. This is the case where the data acquirers 10, 12 are configured by various sensors, and the processor 14 and the output 16 are configurated by a computer.

A computer that infers an emotion of a person as a latent factor includes a CPU 18, a ROM 20, a RAM 22, an interface 24, a hard disk drive (HDD) 26, and a display 28. It is to be noted that in addition to these, the computer includes an input device such as a keyboard and a mouse, and a communication interface for connecting to the Internet. However, this is a well-known configuration and thus is omitted.

A motion sensor serves as the data acquirer 10, acquires motion of joints of a person and supplies the motion to the computer. The motion sensor 30 is configured by a camera, for instance. The motion data on the joints is supplied to the CPU 18 as observational data via the interface 24.

A microphone 32 serves as the data acquirer 12, acquires voice of the person, and supplies the voice to the computer. The voice data is supplied to the CPU 18 as observational data via the interface 24. It is to be noted that the motion sensor 30 and the microphone 32 may be integrated, and a commercially available Kinect may be used.

The CPU 18 reads a processing program stored in the ROM 20 or the HDD 26, and performs the functions of the learner 141, the inferrer 142, and the data interpolator 143 using the RAM 22 as a working memory. Specifically, the CPU 18 performs machine learning by the semi-supervised learning to learn a model, infers an emotion of a person as a latent factor using the model obtained through the learning, and performs data interpolation using the inferred latent factor. The CPU 18 displays an inference result and a data interpolation result on the display 28 as the output 16.

It is to be noted that the functions of the learner 141, the inferrer 142, and the data interpolator 143 may be performed by a single processor, or may be processed in a distributed manner by multiple processors.

Figure 3:
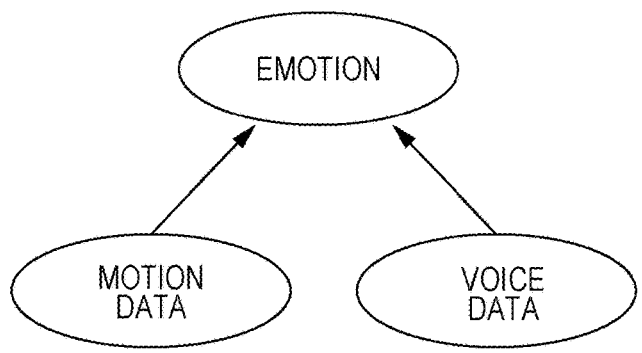
FIG. 3 is a schematic explanatory diagram (part 1) of processing performed by the information processing device.
Figure 4:
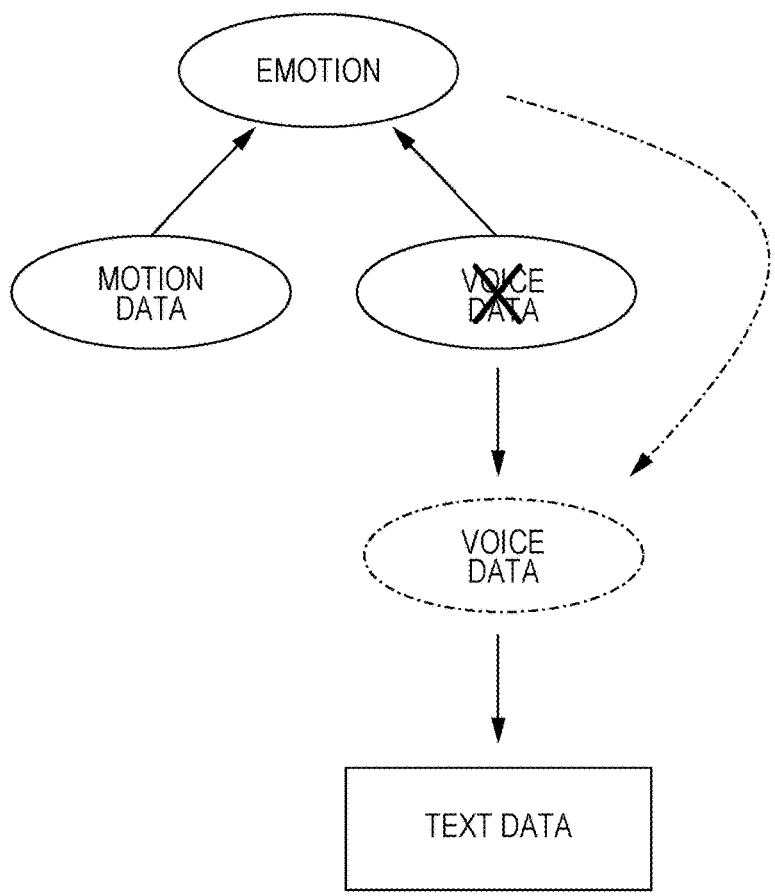
FIG. 4 is a schematic explanatory diagram (part 2) of processing performed by the information processing device.

FIG. 3 and FIG. 4 schematically illustrate the processing by the processor 14. The processor 14 infers an emotion of a person using motion data acquired in time series, and voice data acquired in time series. Although emotions to be inferred include happiness, sadness, fear, anger, dislike, contempt, the emotions are not limited to these. Known techniques for inferring a latent factor include the hidden Markov model (HMM), the recurrent neural network (RNN), the autoencoder (AE), and the variational autoencoder (VAE). However, in the exemplary embodiment, inference is made based on the combination of the RNN and the VAE. Incidentally, in the HMM, although a latent factor of observed sequence data can be inferred, the types of symbol need to be pre-defined, and thus all training data needs to be labeled. In the RNN, although a characteristic of observational data as a hidden layer can be expressed as a continuous value, all training data needs to be labeled similarly. In the AE, although a characteristic by which observational data is reproducible can be extracted and learning can be performed without labeling, the characteristic by which observational data is reproducible is not necessarily a latent factor of the observational data, and unnecessary information may also be included in the characteristic. In the VAE, observational data and a latent factor can be inferred as a pair, and learning can be performed without labeling. The processor 14 combines the RNN and the VAE, and learns a model by the semi-supervised learning.

Also, even when one of the motion data and the voice data, for instance, the voice data is temporarily missing for some reasons, the processor 14 interpolates the missing voice data by continuing to make emotion inference processing and using an inferred emotion. As long as an emotion can be inferred, the missing voice data may not necessarily need to be interpolated. However, for instance, when acquired voice data is converted to text data and the text data is utilized, the missing voice data may need to be interpolated, and thus the missing data is interpolated in consideration of such a situation.

Figure 5:
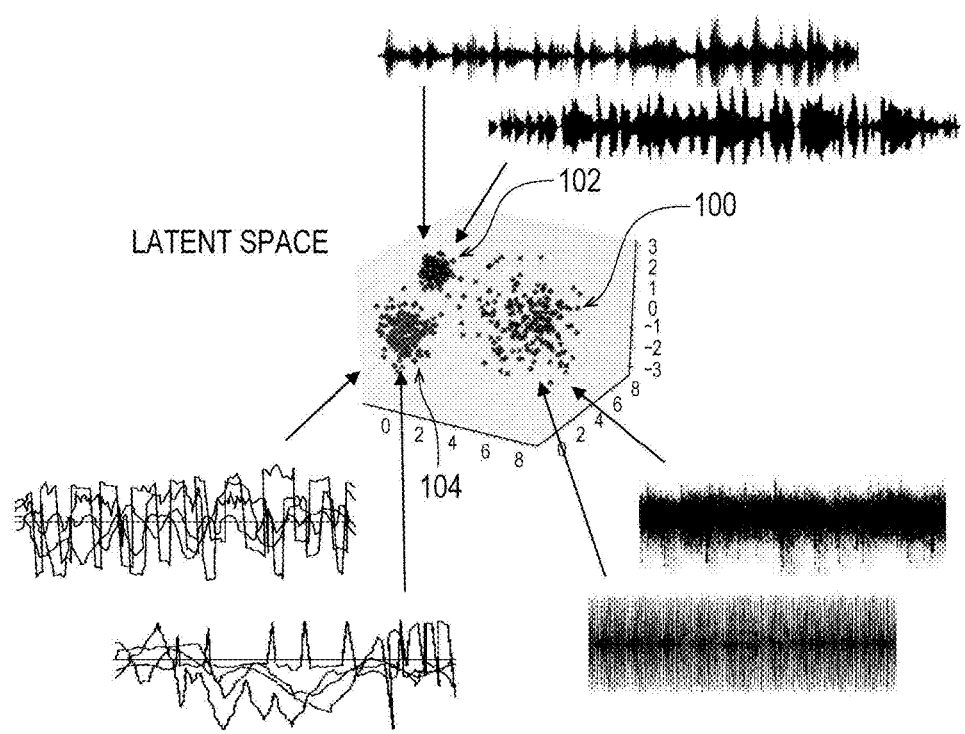
FIG. 5 is a plot explanatory diagram for a latent space.

FIG. 5 schematically illustrates processing for inferring a latent factor such as an emotion. The processor 14 plots collected observational data on a latent space. Observational pieces of data in a similar form are inferred to have a similar origin (cause) of generation, and thus are plotted at near positions onto the latent space.

In FIG. 5, data groups plotted at close positions are illustrated as clusters 100, 102, 104. Under the assumption that each cluster is related to a specific emotion, an emotion can be inferred by determining which cluster the observational data belongs to.

Hereinafter, the learning processing by the learner 141, the inference processing by the inferrer 142, and the data interpolation processing by the data interpolator 143 will be described in more detail.

<Learning Processing>

Figure 6:
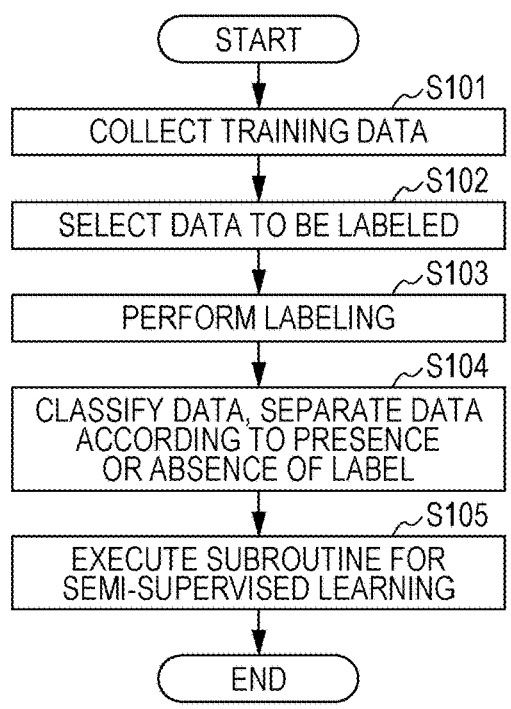
FIG. 6 is a processing flowchart of learning processing.

FIG. 6 illustrates a processing flowchart for the processor 14. It is a processing flowchart for the learner 141, and is the processing performed by the CPU 18.

First, the processor 14 collects training data (S101). The training data is configured by motion data and voice data. Specifically, time-series motion data and voice data are collected from the motion sensor 30 and the microphone 32 via the interface 24. The sampling frequency of the time-series motion data and voice data collected from the motion sensor 30 and the microphone 32 is any frequency, for instance, 1 Hz.

Subsequently, data to be labeled is selected (S102), and the training data is labeled (S103). The selection and labeling of data is done by, for instance, an operator's manual operation of an input device such as a keyboard or a mouse.

Subsequently, the processor 14 classifies data according to "presence or absence of a label" (S104), and performs a learning subroutine using the classified data (S105). The learning subroutine is a subroutine for semi-supervised learning in which data with a label and data without a label are used.

Figure 7:
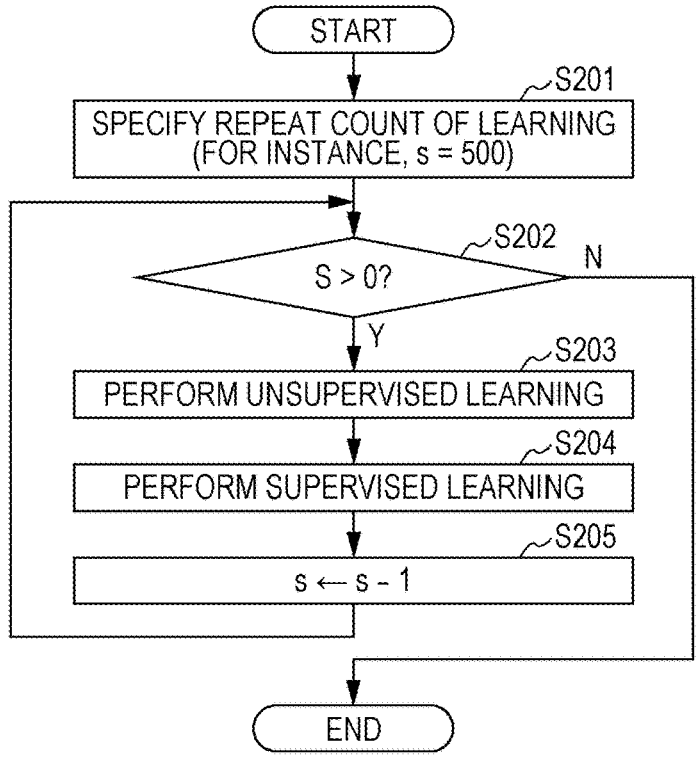
FIG. 7 is a processing flowchart of a subroutine for semi-supervised learning.

FIG. 7 illustrates a processing flowchart for the processing of S105 in FIG. 6, that is, a subroutine for semi-supervised learning.

First, a repeat count s of learning is specified (S201). The repeat count s may be manually set by an operator or a default value may be set and pre-stored in a memory such as the ROM 20. The repeat count s is any number, and may be set such that s=500, for instance.

Subsequently, it is determined whether or not the repeat count s satisfies that s>0 (S202). When s>0 (YES in S202), in other words, when the repeat count still remains, unsupervised learning is performed using the data without a label (S203), and subsequently, supervised learning is performed using the data with a label (S204). The processing in S203 and S204 may be replaced, that is, first, supervised learning is performed using the data with a label, and subsequently, unsupervised learning is performed using the data without a label. The repeat count s is then decremented by 1 (S205), and the processing in S202 to S205 is repeatedly performed.

The repeat count s is sequentially decremented, and when s=0 is finally satisfied (NO in S202), the processing is completed because the learning has been performed for a necessary number of times.

<Estimation Processing>

Figure 8:
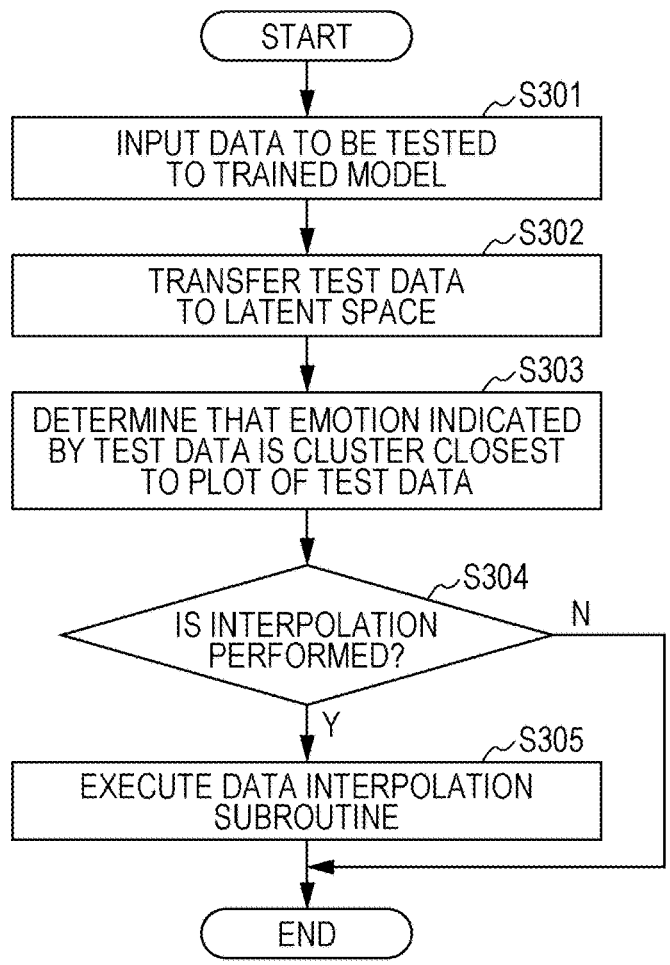
FIG. 8 is a processing flowchart of emotion inference and data interpolation.

FIG. 8 illustrates a processing flowchart for the processor 14. It is a processing flowchart for the inferrer 142 and is the processing performed by the CPU 18. It is assumed that before the processing of FIG. 8 is started, the model learning processing illustrated in FIG. 6 and FIG. 7 has been completed.

First, data to be tested (test data), in other words, data to be inferred is inputted to a trained model (S301).

Subsequently, the inputted test data is processed by the trained model, and is transferred (plotted) onto the latent space (S302). The latent space is the space exemplified in FIG. 5.

Subsequently, it is determined that a cluster closest to the plot of the test data represents an emotion indicated by the test data (S303). For instance, it is determined that the test data indicates one of happiness, sadness, fear, anger, dislike, and contempt. A result of the determination is displayed on the display 28.

Subsequently, it is determined whether or not the test data is interpolated (S304). The determination is made as to whether or not the test data has a missing portion, and when a portion is missing, interpolation of the test data needs to be performed (YES in S304), and a subroutine for data interpolation is executed (S305). For instance, when an emotion is inferred by motion data and voice data, and the voice data has a missing portion temporarily, the missing portion of the voice data is interpolated.

<Data Interpolation>

Figure 9:
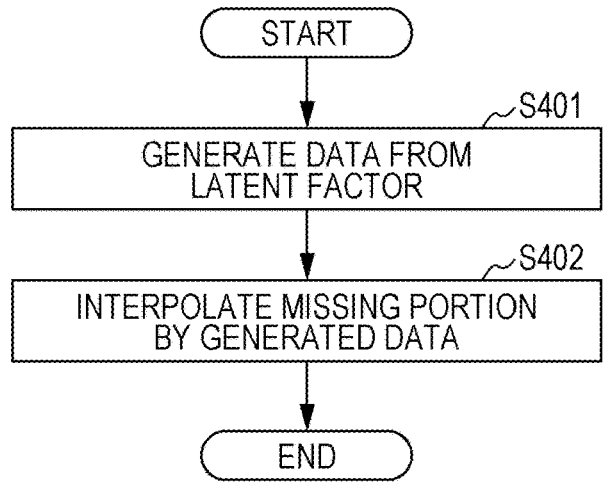
FIG. 9 is a processing flowchart of a data interpolation subroutine.

FIG. 9 illustrates is a processing flowchart for the processing of S305 in FIG. 8, that is, the subroutine for data interpolation. It is the processing of the data interpolator 143, and is the processing performed by the CPU 18.

As illustrated in S303 of FIG. 8, when it is determined that a cluster closest to the plot of the test data represents an emotion indicated by the test data, conversely, test data is generated from the determined emotion (latent factor). When the test data includes motion data and voice data, motion data and voice data are generated from the determined emotion (S401). Needless to say, only missing data may be generated. A missing portion is then interpolated by the data (S402). That is, motion data and voice data are generated from the determined emotion, and are compared with actually inputted motion data and voice data, then a missing portion of the data is replaced by the generated data, and is thereby interpolated.

Figure 10:
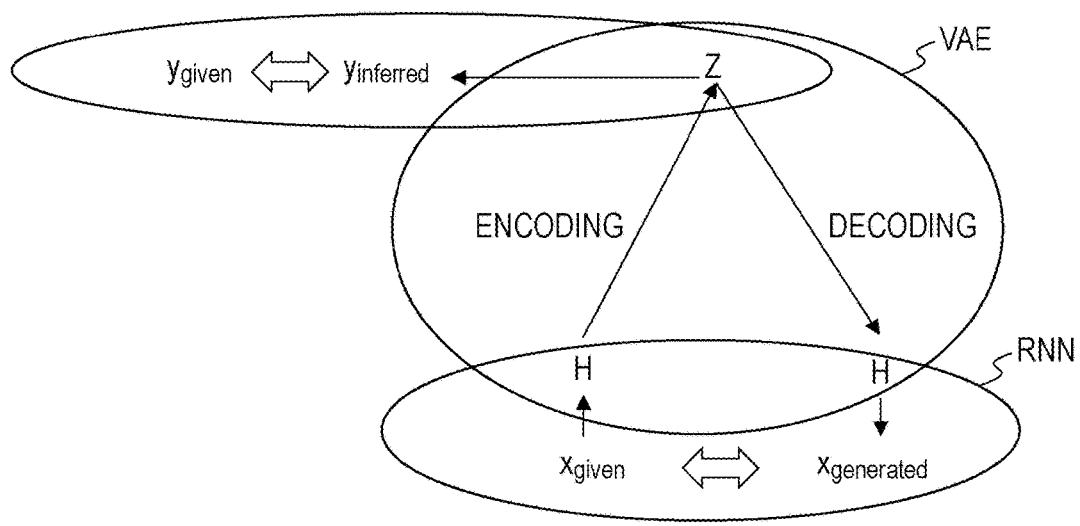
FIG. 10 is a schematic explanatory diagram (part 1) of learning processing.
Figure 11:
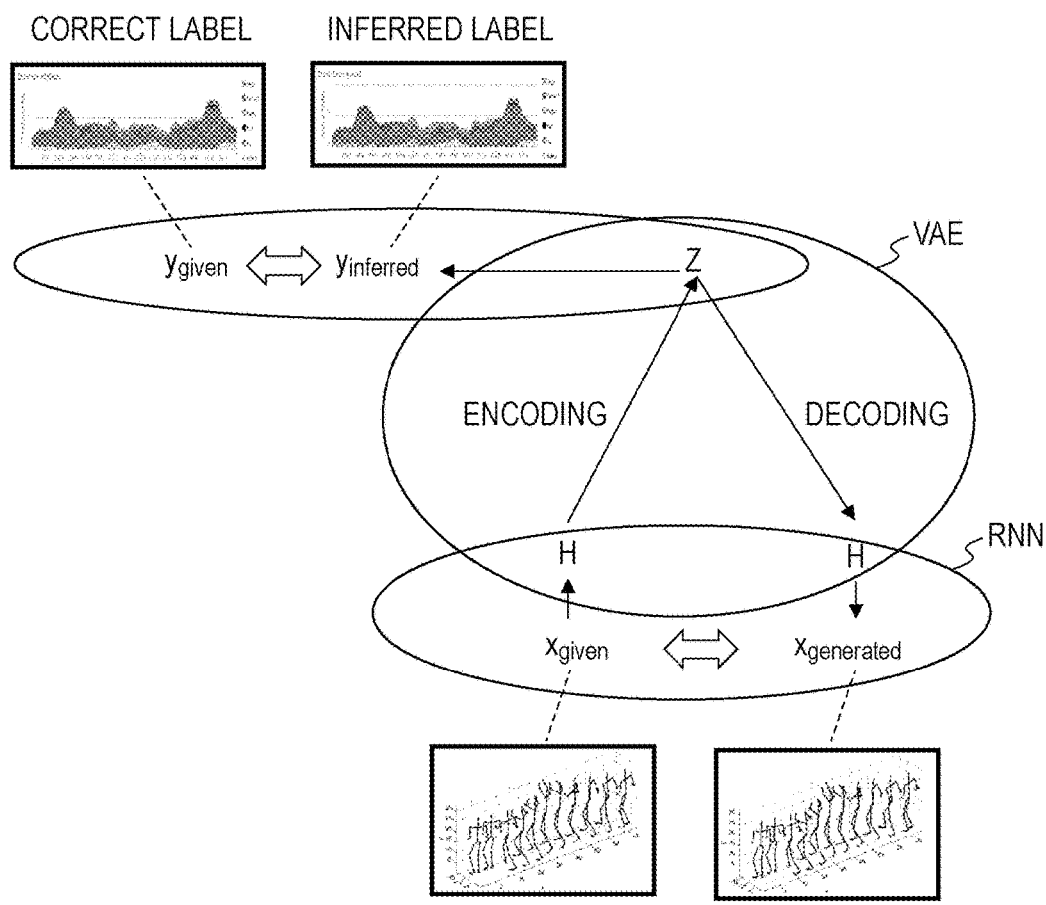
FIG. 11 is a schematic explanatory diagram (part 2) of the learning processing.

FIG. 10 and FIG. 11 schematically illustrate learning processing performed by the learner 141. Ley x be collected observational data (motion data and voice data), H be a characteristic quantity of the observational data, z be a latent variable (emotion), and y be a label, the learner 141 uses the RNN for learning calculation of a characteristic quantity H from the collected observational data $x_{given}$, and uses the VAE, as learning using data without a label, for learning calculation (encoding) of a latent variable (emotion) z from the characteristic quantity H. In addition to these, in order to ensure the accuracy of calculation of the latent variable (emotion) z, data with a label is used, and a label $y_{inferred}$ corresponding to the calculated latent variable z is compared with a label $y_{given}$ as the correct data. In addition, a characteristic quantity H and observational data x are conversely generated from the latent variable z, and the generated observational data $x_{generated}$ is compared with the collected observational data $x_{given}$.

FIG. 11 illustrates the manner how comparison is made. The collected observational data $x_{given}$ and the generated observational data $x_{generated}$ are compared, and learning is performed by adjusting a weight so that the difference (error) between the data attains a minimum. Along with this, the label $y_{inferred}$ corresponding to the inferred latent variable z is compared with the label (correct label) $y_{given}$ as the correct data, and learning is performed by adjusting a weight so that the difference (error) between the data attains a minimum. Since the basic VAE is unsupervised learning (learning using data without a label), the learning is performed using a small quantity of data with a label to minimize the error of the latent variable z while the function of the VAE is maintained, and thus an accuracy of inference can be assured with a small quantity of data with a label.

<Details of Learning Processing>

Figure 12:
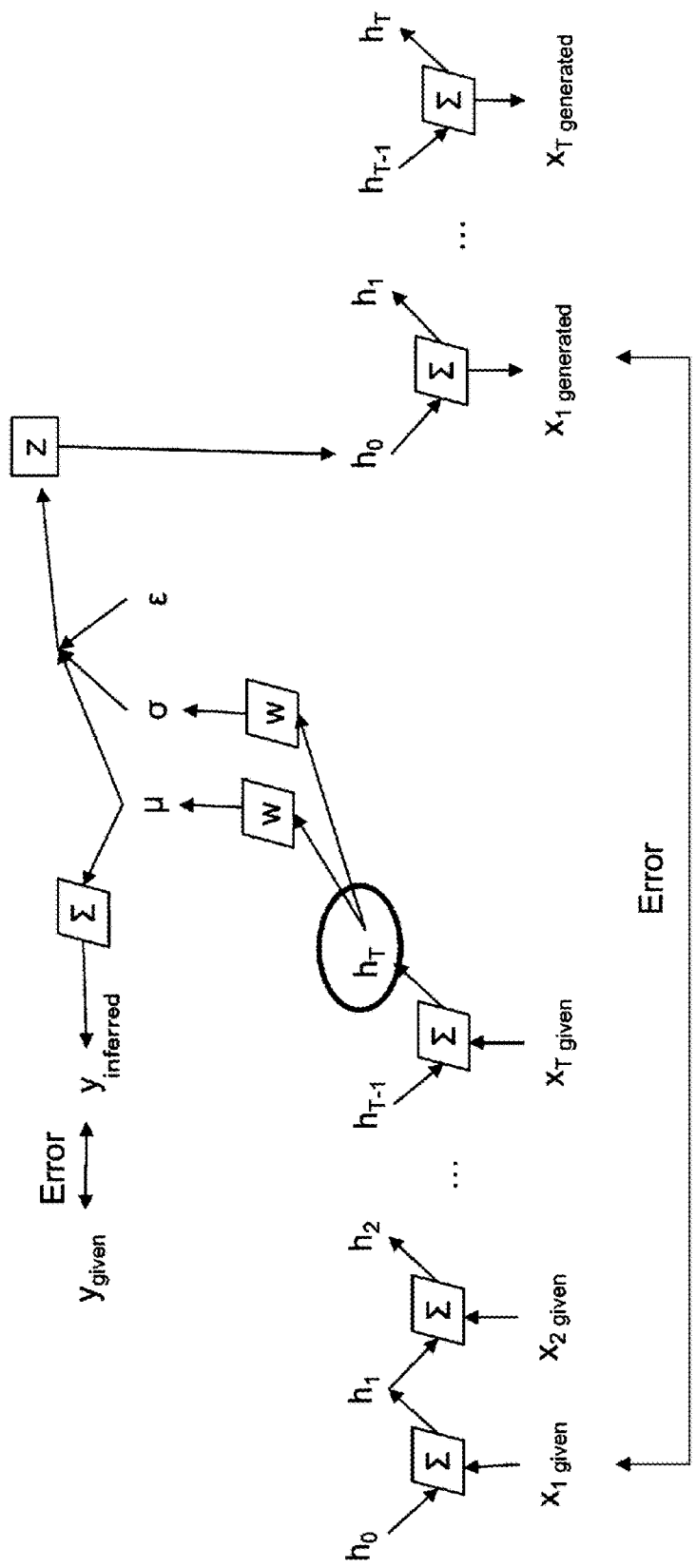
FIG. 12 is a detailed explanatory diagram of the learning processing.

FIG. 12 illustrates the details of the learning processing performed by the learner 141. In FIG. 12, variables are defined as follows:

N is the identification number of modal (N=1, 2 when 2 modals are provided).

T is the time window width. When a sensor transmits data with 1 Hz, z at a time t is inferred using data for the last T seconds from time t−T.

xN is T pieces of time-series data observed in the modal N, that is {xN_1, xN_2, . . . , xN_T}.

hN is the characteristic quantity for T pieces of data of the modal N, that is, {hN_1, hN_2, . . . , hN_T}.

xN_t is xN at t step.

hN_t is hN at t step.

h is the combination of h1 to hN. When 2 modals are provided, h1 has 4 dimensions and h2 has 3 dimensions, h has 7 dimensions.

W_AB is the weight W used for conversion from A to B.

μ is a value nonlinearly converted from h with W_hμ

σ is a value nonlinearly converted from h with W_hσ

ε is a random infinitesimal value, and is generated, for instance, by a normal distribution with an average of 0 and a variance of 0.01.

z is a latent variable and defined by $z=\mu+\sigma\varepsilon$.

$y_{inferred}$ is an inferred label, which a category indicating an emotion.

$y_{given}$ is a correct label (training label).

$hN\tilde{}$ is T characteristic quantities of data of the modal N generated from z.

$xN\tilde{}$ is T pieces of time-series data of the modal N generated from hN~.

$\sigma$ is a nonlinear function, for instance, tan h function, tan h ( ) or sigmoid function, sigmoid ( ).

Here, the dimension of hN and z is specified by an operator before the start of learning, and for instance, the dimension of h1, h2 is specified to 150, and the dimension of z is specified to 30. A default value of each dimension may be set and pre-stored in a memory. In addition, the nonlinear function $\sigma$ is also specified by an operator before the start of learning. A default function may be set and pre-stored in a memory.

The learning is performed by searching for an optimal solution while the weight W is adjusted, and a gradient method, which is typically used in a neural network (NN), may be adopted.

The characteristic quantity h is calculated from the observational data x based on $HN\_t=\sigma(W\_xNhN\cdot xN+W\_hNhN\cdot hN\_t-1)$ using the nonlinear function $\Sigma$ and the weight W. h_T is the characteristic quantity as a history of the observational data x for T steps, and is performed by the RNN.

Also, the latent variable z is calculated from the characteristic quantity h using the weight W based on $\mu=W\_h\mu\cdot hN\_T$, $\sigma=W\_h\sigma\cdot hN\_T$, and $z=\mu+\sigma\varepsilon$.

Where $\mu$ and $\sigma$ are calculated as mapping of h_T, and how h_T is mapped is determined by the VAE learning. The latent variable z is calculated from $\mu$ and $\sigma$, and $\varepsilon$ which is a random variable. The calculated latent variable z is plotted onto the latent space. The latent variable z corresponds to an inferred label $y_{inferred}$.

In the meantime, $h\tilde{}$ is generated from the latent variable z based on $h0\tilde{}=W\_zh\cdot z$, and $hN\tilde{}\_t=\Sigma(W\_xNhN\cdot xN\tilde{}+W\_hNhN\cdot hN\tilde{}\_t-1)$.

Then $x\tilde{}$ is generated from the calculated h~ based on $xN\tilde{}\_t=\Sigma(W\_hNxN\cdot hN\_t)$.

The generated $x\tilde{}$ corresponds to $x_{generated}$.

Learning of weight W proceeds so that an Error which is the difference between the values of $x_{given}$ and $x_{generated}$, and an Error which is the difference between the values of $y_{given}$ and $y_{inferred}$ are minimized.

Figure 13:
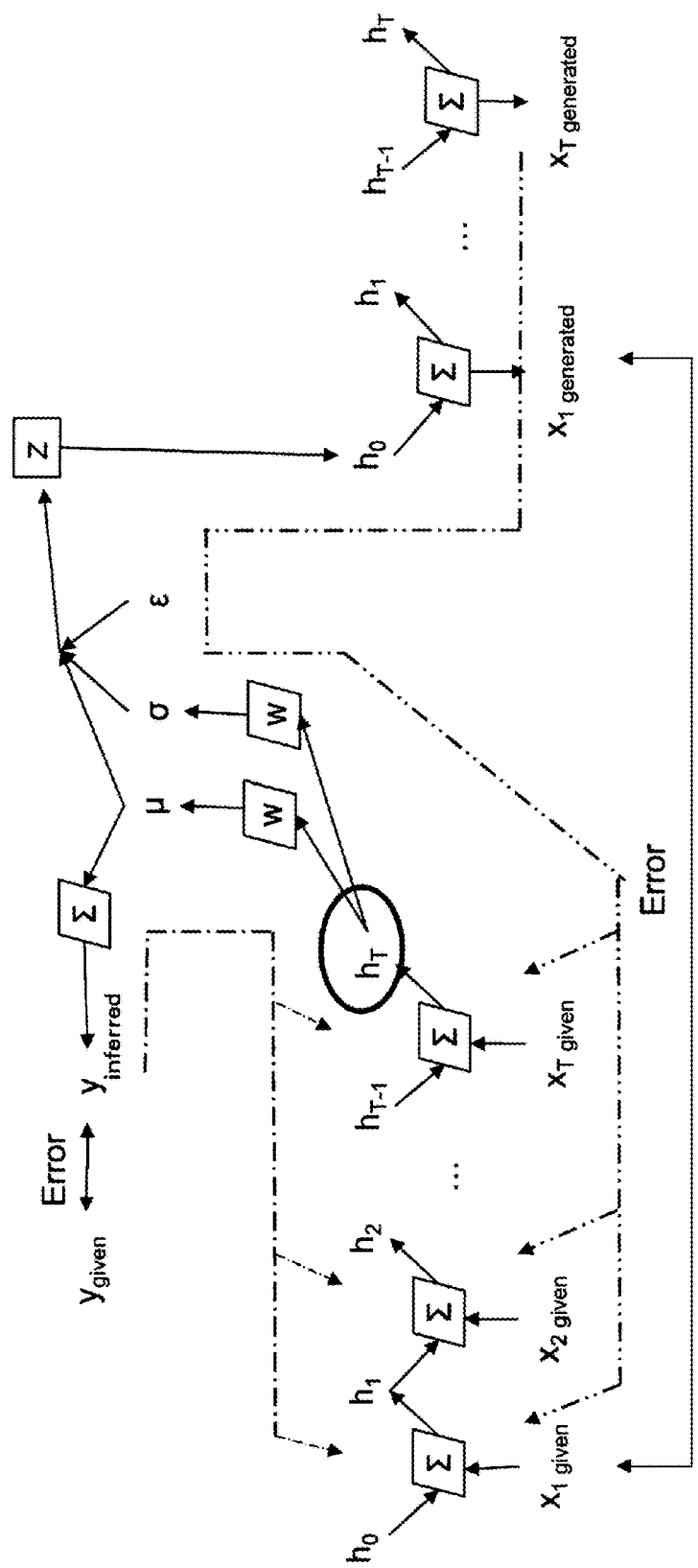
FIG. 13 is an error propagation explanatory diagram.

FIG. 13 illustrates the manner how errors are propagated. As indicated by a dashed-dotted line in FIG. 13, the error as the difference between $y_{given}$ and $y_{inferred}$ is propagated only in the case of data with a label. In contrast, as indicated by a dashed-two dotted line, the error as the difference between $x_{given}$ and $x_{generated}$ is propagated in both cases of data with a label and data without a label. Minimizing these errors allows the accuracy of inference (that is, the accuracy of inference of the latent variable z) of label $y_{inferred}$, and the accuracy of generation of $x_{generated}$ to be improved.

Here, the propagation of the error indicated by the dashed-dotted line does not proceed to the latent variable z. Thus, settings may be made so that label information does not involve generation of data, that is, $x_{generated}$. This indicates that part of learning shown by the dashed-two dotted line is possible even with data without a label, thereby providing a model that allows semi-supervised learning in which both supervised learning and unsupervised learning are performed.

<Details of Data Interpolation Processing>

As described above, a latent variable (emotion) z is inferred, and observational data $x_{generated}$ is generated using the latent variable z. However, when one of multiple modals, in other words, one of multiple pieces of observational data has a missing portion, in order to continue inference only using observational data without a missing portion and to further interpolate the missing data, a function of linking between the multiple modals is called for in the latent variable z.

Figure 14A:
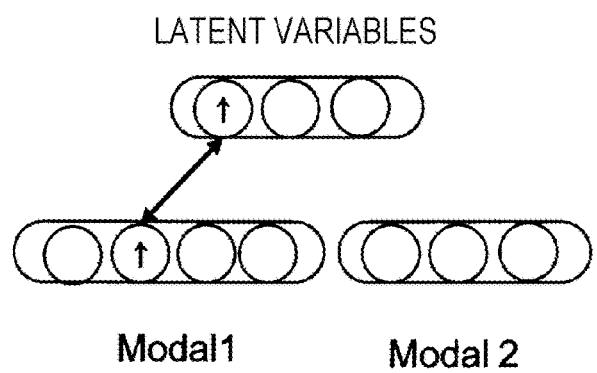
FIG. 14A and FIG. 14B are correlation explanatory diagrams (part 1) between modals.
Figure 14B:
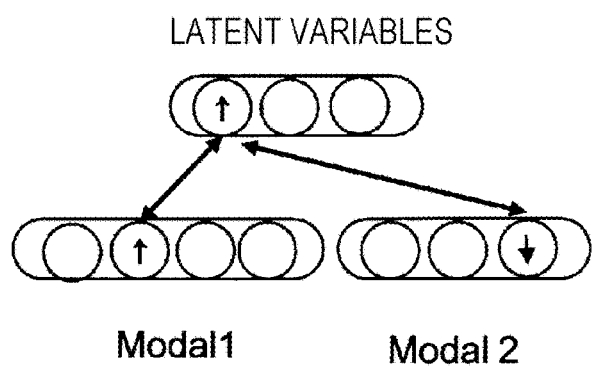

FIG. 14 schematically illustrates a relationship between multiple modals (modal 1 and modal 2 as an example) and the latent variable z. As illustrated in FIG. 14A, when the latent variable z responds only to a variable of the modal 1 out of the modal 1 and the modal 2, occurrence of a missing portion in the modal 1 makes it difficult to continue inference of the latent variable z, and occurrence of a missing portion in the modal 2 also does not allow interpolation of the missing portion in the modal 2 based on the latent variable z. This is because as long as the latent variable z responds only to the modal 1, even when observational data of the modal 2 is generated from the latent variable z, the generated observational data does not correlate to the original observational data of the modal 2. On the other hand, as illustrated in FIG. 14B, when the latent variable z responds to the modal 1 as well as the modal 2, occurrence of a missing portion in one of the modal 1 and the modal 2 still allows a latent factor to be inferred from the remaining modal without a missing portion, and occurrence of a missing portion in the modal 2 allows the missing portion of the modal 2 to be interpolated from the latent variable z. The same goes with when a missing portion occurs in the modal 1. In order to implement this, at the time of machine learning, it is sufficient that a characteristic expression of a modal be forced (conditioned) to be correlated between multiple modals. It should be noted here that a characteristic expression (characteristic quantity) of a modal is to be correlated, and no restriction is imposed on the latent variable z itself. Thus, the accuracy of inference of an emotion expressed by the latent variable z is maintained.

Figure 15:
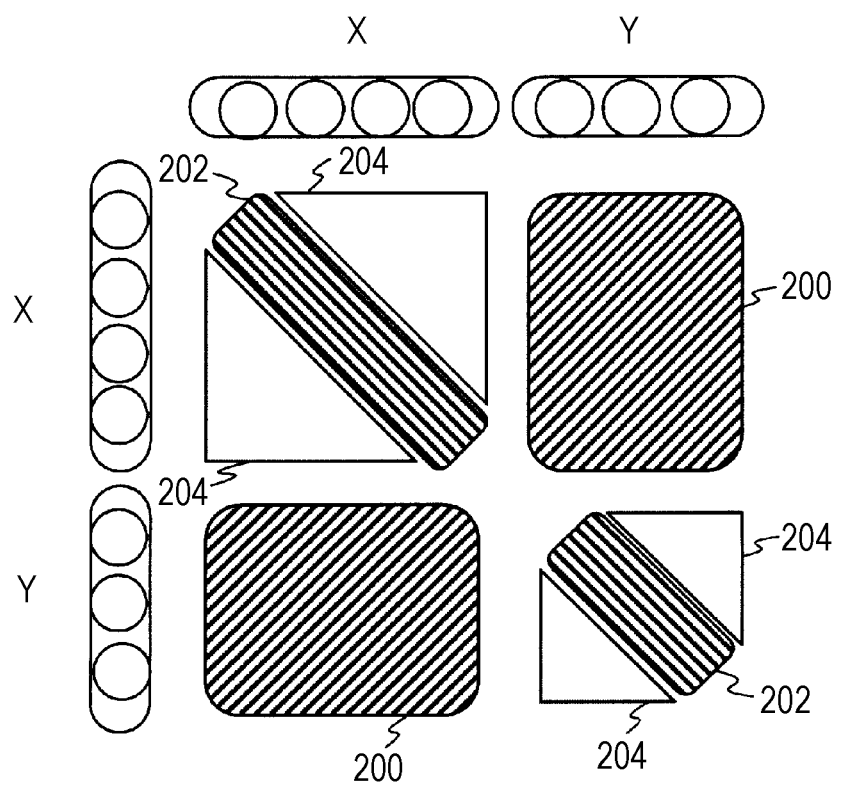
FIG. 15 is a correlation explanatory diagram (part 2) between modals.

FIG. 15 schematically illustrates a method for forcing a characteristic expression of a modal to be correlated between multiple modals at the time of learning. In FIG. 15, X is a characteristic quantity calculated from the modal 1 by the RNN, and Y is a characteristic quantity calculated from the modal 2 by the RNN. The characteristic quantity X is expressed in 4 dimensions as an example, and the characteristic quantity Y is expressed in 3 dimensions as an example.

As illustrated in FIG. 15, the correlation between the characteristic quantity X and the characteristic quantity Y can be expressed by a matrix, the values of elements 200 indicated by a diagonal line upward sloping to the right are set to be relatively large, the values of elements 202 (diagonal elements) indicated by a diagonal line upward sloping to the left are set to be close to 1, and the values of other elements 204 are set to be relatively small, thereby providing correlation between the modal 1 with the characteristic quantity X and the modal 2 with the characteristic quantity Y. Specifically, the following functions are used as objective functions.

$$L = \text{corr}(X, Y) + \text{decorr}(X) + \text{decorr}(Y)$$

$$\text{corr}(X, Y) = \frac{(X - \hat{X})(Y - \hat{Y})}{\sqrt{\text{Var}(X)\text{Var}(Y)}}$$

$$\text{decorr}(X) = \sum_{i,j} [\Sigma_{i,j} - \delta(i, j)]^2$$

The characteristic quantities X, Y are calculated so that these functions each attain a maximum, where $\hat{X}$ and $\hat{Y}$ indicate respective averages, and Var(X), Var(Y) indicate respective variances of X and Y.

Figure 16:
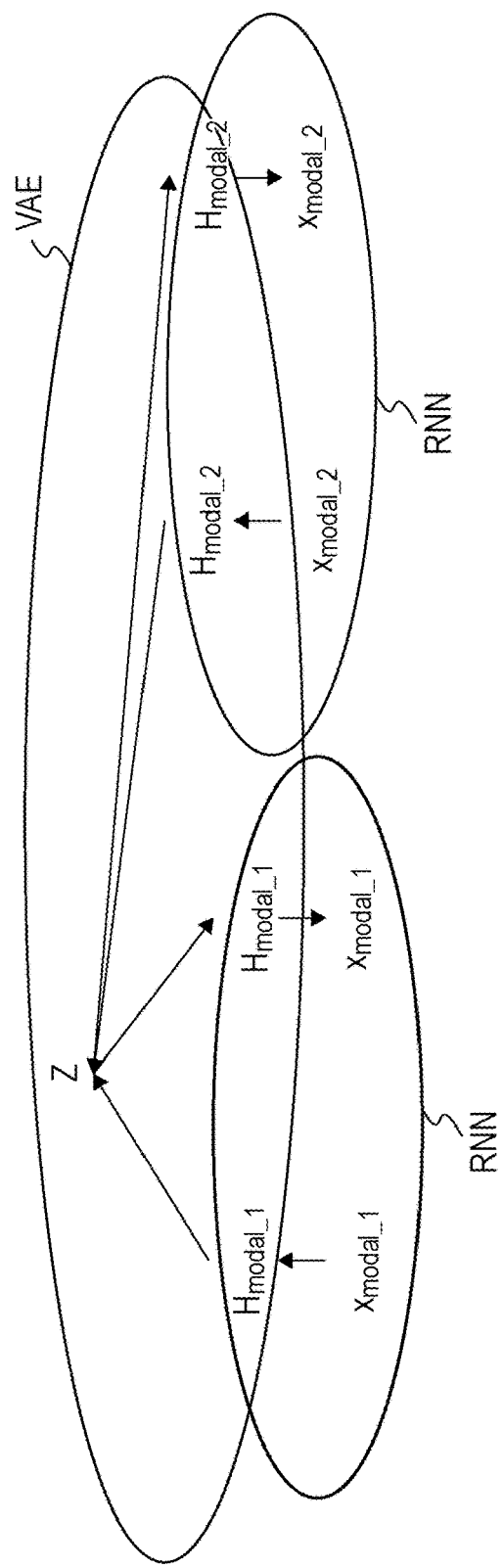
FIG. 16 is a schematic explanatory diagram of the learning processing by multiple modals.
Figure 17:
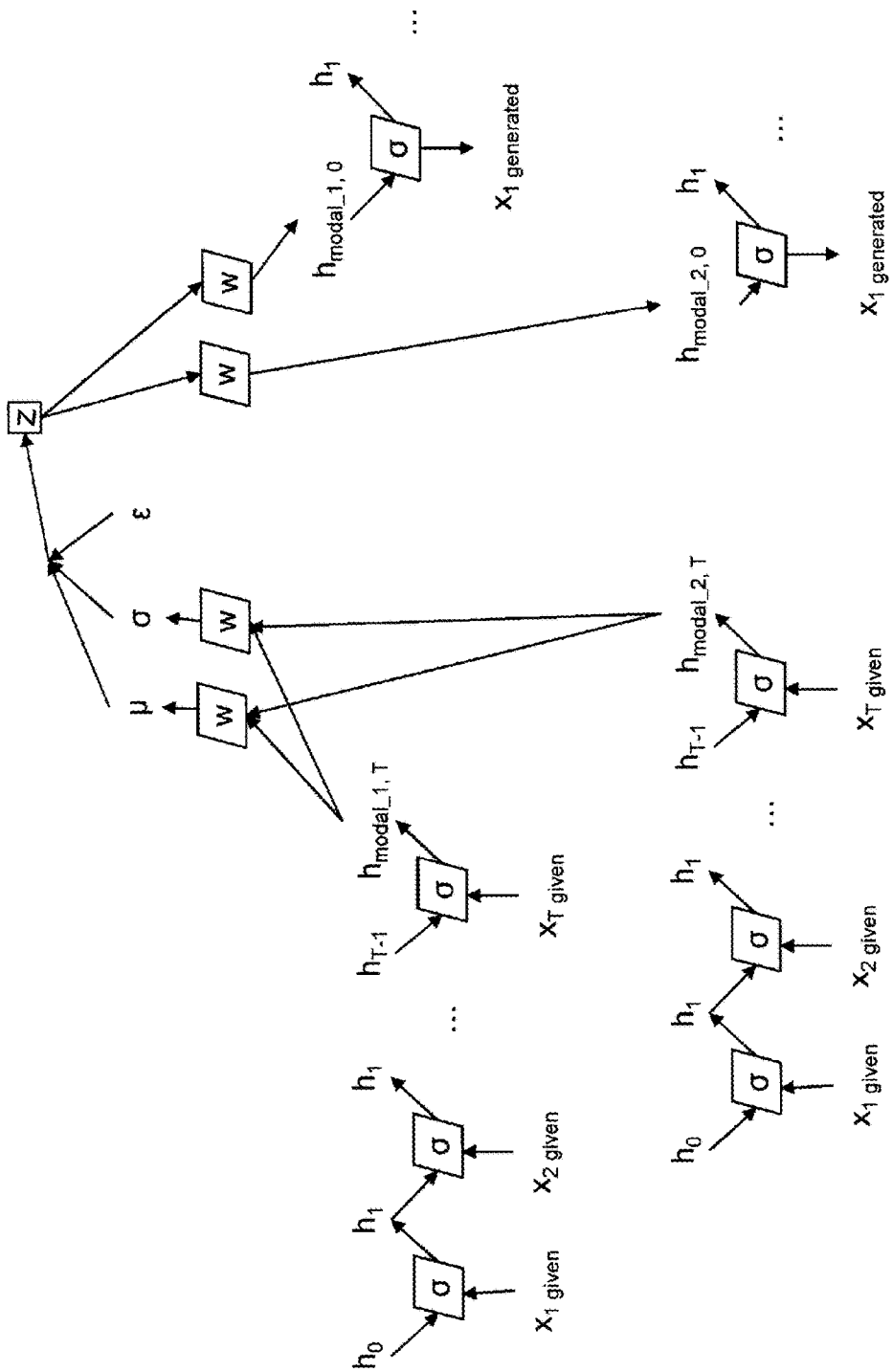
FIG. 17 is a detailed explanatory diagram of the learning processing by multiple modals.

FIG. 16 and FIG. 17 schematically illustrate learning processing using multiple modals, and respectively correspond to FIG. 10 and FIG. 12 that each illustrate processing of one modal.

A characteristic quantity Hmodal1 is calculated from observational data xmodal1 of the modal 1, a characteristic quantity Hmodal2 is calculated from observational data xmodal2 of the modal 2, and a latent variable z in common with two characteristic quantities is calculated from these characteristic quantities. Also, the observational data xmodal1 of the modal 1 is generated and the observational data xmodal2 of the modal 2 is generated from the latent variable z. The generated these pieces of observational data are used for interpolation of a missing portion of the modal 1 or the modal 2.

As illustrated in FIG. 17, for the modal 1, the characteristic quantity h is calculated from the observational data x using the nonlinear function Σ and the weight W based on HN_t=Σ(W_xNhN·xN+W_hNhN·hN_t−1), and for the modal 2, the characteristic quantity h is similarly calculated from the observational data x. Each characteristic quantity h is calculated so that the above-mentioned objective function is maximized.

Let hmodal_1, T be the characteristic quantity h of the modal 1, and hmodal_2, T be the characteristic quantity h of the modal 2, then a common latent variable z is calculated from these two characteristic quantities using the weight W based on $$\mu = W\_h\mu \cdot hN\_T,$$

$$\sigma = W\_h\sigma \cdot hN\_T, \text{ and}$$

$$z = \mu + \sigma\varepsilon,$$

where the hmodal_1, T and the hmodal_2, T are used for the characteristic quantity h.

Conversely, a characteristic quantity of the modal 1 is generated from the latent variable z based on $$h0^- = W\_zh \cdot z, \text{ and}$$

$$hN^-\_t = \Sigma(W\_xNhN \cdot xN^- + W\_hNhN \cdot hN^-\_t-1).$$

In FIG. 17, the calculated characteristic quantity of the modal 1 is denoted by hmodal_1, 0. The observational data of the modal 1 is generated from the calculated characteristic quantity of the modal 1 based on xN¯_t=Σ(W_hNxN·hN_t). In FIG. 17, the calculated observational data of the modal 1 is denoted by x1 generated. The same goes with for the modal 2.

The latent variable z is a latent variable in common with, that is, correlated between the modal 1 and the modal 2, and a missing portion of the modal 1 or the modal 2 can be interpolated using these pieces of generated observational data. As described already, for instance, the modal 1 is motion of joints of a person, and the modal 2 is voice data.

It is to be noted that the variational autoencoder (VAE) used in the exemplary embodiment is publicly known, and will be briefly described below. The details are described, for instance, in D. P. Kingma and M. Welling, "Auto-encoding variational Bayes," in Proceedings of the International Conference on Learning Representations (ICLR-14), 2014.

Let x, z be a variable for variational autoencoder and a latent variable, respectively, and the probability model is defined as follows: $P_\theta(x,z) = P_\theta(x|z)P_\theta(z)$, where $\theta$ is a parameter of the probability model.

When a parameter $\theta$ for maximizing a peripheral likelihood
$P_\theta(x) = \int P_\theta(x,z)dz$ is determined, a probability distribution $q(z|x)$ with a parameter $\varphi$ that approximates the posterior distribution $P_\theta(z|x)$ is used.

By using the probability distribution, the peripheral likelihood can be expressed by $$p_\theta(x) = KL[q_\phi(z|x)\|p_\theta(z|x)] + L(\theta,\phi;x)$$

Here, the first term $$KL[q(z) \| p(z)] \equiv \int_q (z)\log\frac{q(z)}{p(x)}dz$$

of the right-hand side is KL divergence, and the second term is defined by $$L(\theta, \phi : x) \equiv \int_{q_\phi} (z|x)\log\frac{p_\theta(x, z)}{q_\phi(z|x)}dz,$$

which is the variational lower limit of the peripheral likelihood. The peripheral likelihood is also increased by maximizing the variational lower limit for the parameters $\theta$, $\varphi$.

As a multivariate standard gaussian distribution without a parameter, N(z; 0,I) I is the identity matrix, the prior distribution $P_\theta(z)$ gives the conditional distribution as follows: $P_\theta(x,z) = N(x;\mu(z),\sigma^2(z)I)$ Here, $\mu(z)$ and $\sigma^2(z)$ are values determined by a multilayer perceptron with input of z.

Similarly, the approximate distribution $q_\theta(z|x)$ is expressed using a multilayer perceptron.

For the parameter of the model defined as $q_\theta(x|z) = N(z;\mu(x),\sigma^2(x)I)$, the variational lower limit is maximized.

The variational lower limit can be expressed by $$L(\theta,\phi;x) = -KL[q_\phi(z|x)\|p_\theta(z)] + \int q_\phi(z|x)\log p_\theta(x|z)dz$$

The first term is the KL divergence between gaussian distributions. The second term is inferred, for instance, by the Monte Carlo method. In the calculation of the second term, a latent variable, in which noise is added to observation x, is encoded.

The encoded z is decoded through $P_\theta(x|z)$, and is compared with observational data. Specifically, the second term shows the accuracy of restoration. On the other hand, the first term is the KL divergence between the prior distribution and the posterior distribution of the latent variable, and serves as a regularization term.

Although the exemplary embodiment of the invention has been described so far, the invention is not limited to this and various modifications may be made. Modification examples will be described below.

Modification Example 1

For instance, in the exemplary embodiment, as the multiple modals, two modals, that is, motion of joints of a person and voice data have been exemplified. However, a latent factor (emotion) may also be inferred using three or more modals, for instance, motion of joints of a person, motion of facial muscles of the person and voice data. It is to be noted that a certain correlation probably exist between these three modals, and thus the correlation can be recognized by performing learning at the same time using a single model as in the exemplary embodiment.

Modification Example 2

Although motion of joints and motion of facial muscles of the person can be captured by respective cameras, the capturing areas of these cameras may be different. In this case, although it may be presumed that collecting one of two pieces of data may fail, inference of a latent factor (emotion) is possible with only one piece of the data, and thus the information processing device has excellent robustness.

Modification Example 3

Also, in the exemplary embodiment, even when voice data has a missing portion, conversion of voice data to text data is made possible by interpolating the voice data, and in addition to this, the interpolated data may be used for other applications. Specifically, in the case where an emotion as a latent factor is inferred from motion data on the joints, motion data on the face, and the voice data as the observational data, when the motion data on the face has a missing portion, the missing portion of the motion data on the face is interpolated and outputted based on the inferred emotion. This can be expressed such that the motion of the face is artificially composed and simulated.

Modification Example 4

Also, in the exemplary embodiment, as illustrated in FIG. 1, the processor 14 includes the learner 141, the inferrer 142, and the data interpolator 143. However, when what is needed is to infer a latent factor even with occurrence of a missing portion in the observational data, the data interpolator 143 may not be provided. Needless to say, although the data interpolator 143 is provided as a functional module, the function module for data interpolation may be bypassed or disabled according to an application.

Modification Example 5

Also, in the exemplary embodiment, the CPU 18 serves as the processor 14 and implements each of learning, inference, and data interpolation processing by executing a processing program stored in the ROM 20 or the HDD 26. However, part of these functions may be implemented by hardware processing rather than software processing by execution of a processing program. The hardware processing may be performed by using a circuit such as an ASIC or a field programmable gate array (FPGA), for instance. It is to be noted that these hardware circuits may include a graphics processing unit (GPU) that handles image processing.

Modification Example 6

Also, in the exemplary embodiment, as the emotions, happiness, sadness, fear, anger, dislike, and contempt have been exemplified. However, the emotions may include an inner mental state related to so-called mental disorder such as a depression.

Modification Example 7

Furthermore, the information processing device in the exemplary embodiment may be incorporated in a robot that is capable of inferring an emotion of a person and taking an appropriate action based on the inferred emotion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a first data acquirer that acquires first observational data;
a second data acquirer that acquires second observational data; and
a processor that performs machine learning by semi-supervised learning to output an emotion of a person as a latent factor using training data of the first observational data and the second observational data, and that infers and outputs the emotion from at least one of the first observational data and the second observational data using a trained model,
wherein the processor further generates the first observational data and the second observational data from the latent factor obtained through the inference, and interpolates a missing portion of at least one of the first observational data and the second observational data respectively acquired by the first data acquirer and the second data acquirer, by using at least one of the generated first observational data and second observational data, and outputs the interpolated portion.

2. The information processing device according to claim 1,
wherein the processor performs the machine learning by a combination of a recurrent neural network (RNN) and a variational autoencoder (VAE).

3. The information processing apparatus according to claim 2,
wherein the first observational data is motion data on a person, and
the second observational data is voice data on the person.

4. The information processing device according to claim 1,
wherein the processor infers the latent factor using the training data of the first observational data and the second observational data, and performs the machine learning by comparing a label obtained by the inference with a label given as correct data.

5. The information processing apparatus according to claim 4,
wherein the first observational data is motion data on a person, and
the second observational data is voice data on the person.

6. The information processing device according to claim 1,
wherein the processor calculates a first characteristic quantity of the first observational data acquired by the first data acquirer and a second characteristic quantity of the second observational data acquired by the second data acquirer, infers the latent factor based on the first characteristic quantity and the second characteristic quantity, and calculates the first characteristic quantity and the second characteristic quantity so that the first characteristic quantity and the second characteristic quantity are correlated to each other.

7. The information processing apparatus according to claim 6,
wherein the first observational data is motion data on a person, and
the second observational data is voice data on the person.

8. The information processing apparatus according to claim 1,
wherein the first observational data is motion data on a person, and
the second observational data is voice data on the person.

9. The information processing device according to claim 1,
wherein the first observational data is motion data on a person,
the second observational data is voice data on the person, and
the processor interpolates a missing portion of the second observational data and outputs the interpolated portion.

10. An information processing device comprising:
a first data acquirer that acquires first observational data;
a second data acquirer that acquires second observational data; and
a processor that performs machine learning by semi-supervised learning to output an emotion of a person as a latent factor using training data of the first observational data and the second observational data, and that infers and outputs the emotion from at least one of the first observational data and the second observational data using a trained model,
wherein the processor infers the latent factor using the training data of the first observational data and the second observational data, generates the first observational data and the second observational data from the latent factor obtained through the inference, and performs the machine learning by comparing the generated first observational data and second observational data with the first observational data and the second observational data acquired by the first data acquirer and the second data acquirer, respectively.

11. The information processing apparatus according to claim 10,
wherein the first observational data is motion data on a person, and
the second observational data is voice data on the person.

12. An information processing device comprising:
a first data acquirer that acquires first observational data;
a second data acquirer that acquires second observational data; and
a processor that performs machine learning by semi-supervised learning to output an emotion of a person as a latent factor using training data of the first observational data and the second observational data, and that infers and outputs the emotion from at least one of the first observational data and the second observational data using a trained model,
wherein the processor performs the machine learning by a combination of a recurrent neural network (RNN) and a variational autoencoder (VAE), and
wherein the processor uses the RNN to calculate a first characteristic quantity of the first observational data acquired by the first data acquirer and a second characteristic quantity of the second observational data acquired by the second data acquirer, and uses the VAE to infer the latent factor using the first characteristic quantity and the second characteristic quantity.

13. The information processing apparatus according to claim 12,
wherein the first observational data is motion data on a person, and
the second observational data is voice data on the person.

14. An information processing device comprising:
a first data acquirer that acquires first observational data;
a second data acquirer that acquires second observational data; and
a processor that performs machine learning by semi-supervised learning to output an emotion of a person as a latent factor using training data of the first observational data and the second observational data, and that infers and outputs the emotion from at least one of the first observational data and the second observational data using a trained model,
wherein the processor performs the machine learning by a combination of a recurrent neural network (RNN) and a variational autoencoder (VAE),
wherein the first observational data is motion data on a person, and the second observational data is voice data on the person, and
wherein the processor converts the interpolated second observational data to text data, and outputs the text data.

15. A non-transitory computer readable medium storing a program causing a computer to execute a process, the process comprising:
inputting first observational data and second observational data to the computer;
performing machine learning by semi-supervised learning to output an emotion of a person as a latent factor using training data of the first observational data and the second observational data;
inferring and outputting the emotion from at least one of the first observational data and the second observational data using a trained model;
generating the first observational data and the second observational data from the latent factor obtained through the inference;
interpolating a missing portion of at least one of the first observational data and the second observational data respectively input to the computer, by using at least one of the generated first observational data and second observational data; and
outputting the interpolated portion.

* * * * *